(12) United States Patent
Lin et al.

(10) Patent No.: US 10,562,594 B2
(45) Date of Patent: Feb. 18, 2020

(54) RUDDER ASSEMBLY

(71) Applicant: DALIAN UNIVERSITY OF TECHNOLOGY, Dalian (CN)

(72) Inventors: Yan Lin, Dalian (CN); Xiaoning Jiang, Dalian (CN); Yunlong Wang, Dalian (CN)

(73) Assignee: DALIAN UNIVERSITY OF TECHNOLOGY, Dalian (CN)

( * ) Notice: Subject to any disclaimer, the term of this patent is extended or adjusted under 35 U.S.C. 154(b) by 0 days.

(21) Appl. No.: 16/130,993

(22) Filed: Sep. 13, 2018

(65) Prior Publication Data

US 2019/0009861 A1 Jan. 10, 2019

Related U.S. Application Data

(63) Continuation-in-part of application No. PCT/CN2017/078082, filed on Mar. 24, 2017.

(30) Foreign Application Priority Data

Apr. 6, 2016 (CN) .......................... 2016 1 0208445

(51) Int. Cl.
*B63H 25/06* (2006.01)
*B63B 1/38* (2006.01)
(Continued)

(52) U.S. Cl.
CPC .............. *B63B 1/38* (2013.01); *B63H 25/24* (2013.01); *B63H 25/26* (2013.01); *B63H 25/38* (2013.01);
(Continued)

(58) Field of Classification Search
CPC . B63B 1/38; B63B 2001/38; B63B 2001/385; B63H 25/38; B63H 2025/38
(Continued)

(56) References Cited

U.S. PATENT DOCUMENTS

| 8,800,459 B2 * | 8/2014 | Lin ........................... B63B 1/38 |
| | | 114/67 A |
| 2013/0036964 A1 * | 2/2013 | Lin ........................... B63B 1/38 |
| | | 114/67 A |

FOREIGN PATENT DOCUMENTS

| CN | 105752309 A | * | 7/2016 | ................ B63B 1/38 |
| CN | 205469752 U | * | 8/2016 | ................ B63B 1/38 |

OTHER PUBLICATIONS

Derwent-Acc-No. 2016-54147K: Abstracted-Pub-No. CN 205469752 U (A Univ Dalian Technology [UYDA]), Jiang X; Li X ; Lin Y; Aug. 17, 2016; Abstract and Figure. (Year: 2016).*

(Continued)

*Primary Examiner* — Daniel V Venne
(74) *Attorney, Agent, or Firm* — Matthias Scholl P.C.; Matthias Scholl

(57) ABSTRACT

A rudder assembly, including a steering engine; an axial hollow rudder stock; a rudder blade; a gas release unit; and a tiller. The steering engine is disposed in a vessel stern. The tiller is connected to the steering engine. The axial hollow rudder stock includes a through hole. The through hole is small and disposed along the axis of the axial hollow rudder stock. The gas release unit is disposed in the vessel stern, and includes a control cabinet. The control cabinet includes a reagent storage tank, a reagent conveying hose connected to the reagent storage tank, a compressed air bottle, a pressure hose connected to the compressed air bottle, and a console. The pressure hose and the reagent conveying hose pass through the through hole of the axial hollow rudder stock, and then communicate with the cavity of the rudder blade.

5 Claims, 8 Drawing Sheets

(51) Int. Cl.
  *B63H 25/38* (2006.01)
  *B63H 25/26* (2006.01)
  *B63H 25/52* (2006.01)
  *B63H 25/24* (2006.01)

(52) U.S. Cl.
  CPC ........ *B63H 25/52* (2013.01); *B63B 2001/385* (2013.01); *Y02T 70/122* (2013.01)

(58) Field of Classification Search
  USPC ..... 114/67 A, 162, 164, 165, 166, 167, 278, 114/280, 281
  See application file for complete search history.

(56) References Cited

OTHER PUBLICATIONS

Derwent-Acc-No. 2013-M67975: Abstracted-Pub-No. KR 2013088961 A, Eun S P[Keuni], Kim S[Kimsi], Kim S Y[Kimsi], Park K[Parki], Park K S[Parki], Sung Y K[Sungi]; Aug. 2013; Abstract and Figure. (Year: 2013).*

International Search Report for PCT/CN2017/078082 dated Jun. 27, 2017. (Year: 2017).*

* cited by examiner

RUDDER ASSEMBLY

CROSS-REFERENCE TO RELATED APPLICATIONS

This application is a continuation-in-part of International Patent Application No. PCT/CN2017/078082 with an international filing date of Mar. 24, 2017, designating the United States, now pending, and further claims foreign priority benefits to Chinese Patent Application No. 201610208445.8 filed Apr. 6, 2016. The contents of all of the aforementioned applications, including any intervening amendments thereto, are incorporated herein by reference.

BACKGROUND OF THE INVENTION

Field of the Invention

This disclosure relates to the field of shipbuilding, and more particularly to a rudder assembly.

Description of the Related Art

Typically, a rudder includes a rudderstock and a rudder blade. The rudderstock connects the rudder blade and a driving mechanism to transfer the rudder torque. The function of the rudder is simple and cannot meet the development requirement of the modern shipping industry.

SUMMARY OF THE INVENTION

In view of the above-described problems, it is one objective of the invention to provide a rudder assembly that can release compressed air and chemical reagents, thus providing the vessels with the functions of emission reduction, drag reduction and defoaming sailing.

To achieve the above objective, in accordance with one embodiment of the invention, there is provided a rudder assembly, comprising: a steering engine; an axial hollow rudder stock, the axial hollow rudder stock comprising a through hole; a rudder blade comprising a cavity and a nozzle; a gas release unit; and a tiller.

The steering engine is disposed in a vessel stern. The tiller is connected to the steering engine. The axial hollow rudder stock comprises an upper end connected to the tiller, and a lower end fixedly connected to the rudder blade. The axial hollow rudder stock is fixed on the vessel stern via an upper rudder bearing and a lower rudder bearing. The rudder blade is hung below the vessel stern, and is connected to the axial hollow rudder stock through a taper joint. The nozzle is disposed at a bottom of the rudder blade. The gas release unit is disposed in the vessel stern, and comprises a control cabinet. The control cabinet comprises a reagent storage tank, a reagent conveying hose connected to the reagent storage tank, a compressed air bottle, a pressure hose connected to the compressed air bottle, and a console; and the pressure hose and the reagent conveying hose pass through the through hole of the axial hollow rudder stock, and then communicate with the cavity of the rudder blade.

In a class of this embodiment, the through hole is disposed along an axis of the axial hollow rudder stock.

In a class of this embodiment, the cavity is an independent structure located at a lower part of the rudder blade.

In a class of this embodiment, the nozzle is streamlined and comprises three releasing holes facing different directions.

In a class of this embodiment, two sides of the rudder blade comprise a plurality of uniformly distributed holes for releasing compressed air and chemical reagents.

Advantages of the rudder assembly are summarized as follows. The rudder assembly of the disclosure comprises a steering engine; an axial hollow rudder stock; a rudder blade; a gas release unit; and a tiller. The steering engine is disposed in a vessel stern. The axial hollow rudder stock comprising a through hole. The through hole is small and disposed along the axis of the axial hollow rudder stock. The gas release unit is disposed in the vessel stern, and comprises a control cabinet. The control cabinet comprises a reagent storage tank, a reagent conveying hose connected to the reagent storage tank, a compressed air bottle, a pressure hose connected to the compressed air bottle, and a console. The pressure hose and the reagent conveying hose pass through the through hole of the axial hollow rudder stock, and then communicate with the cavity of the rudder blade. The horizontal position of the nozzle is lower than the propeller of the vessel. The compressed air and the chemical reagents are pumped into the pressure hose and the reagent conveying hose, pass through the axial hollow rudder stock, enter the cavity of the rudder blade, and then release via the nozzle. The rudder assembly of the disclosure can release compressed air and chemical reagents, thus providing the vessels with the functions of emission reduction, drag reduction and defoaming sailing.

BRIEF DESCRIPTION OF THE DRAWINGS

The invention is described hereinbelow with reference to the accompanying drawings, in which.

Figure 1:
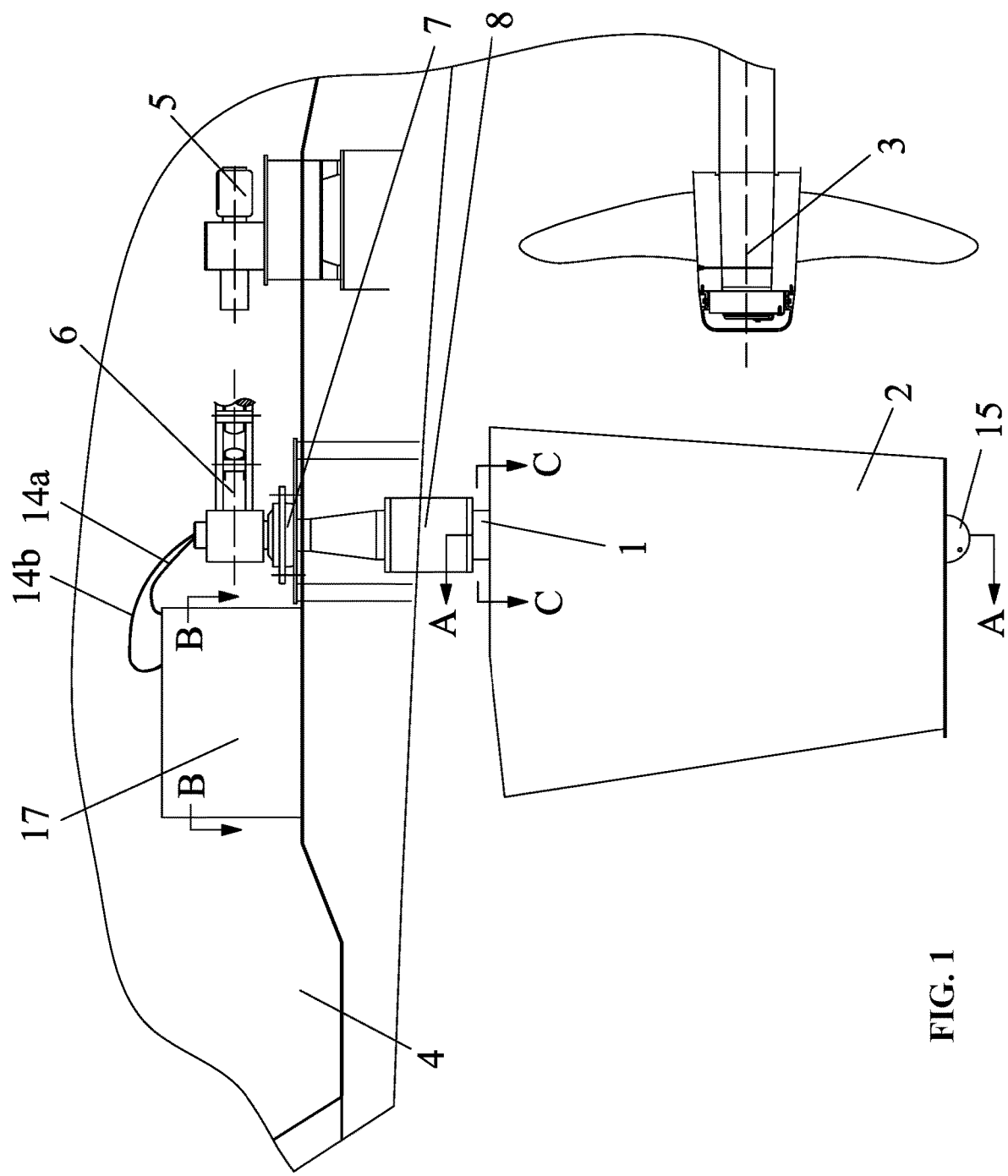
FIG. 1 is a schematic diagram of a rudder assembly in accordance with one embodiment of the disclosure.
Figure 2:
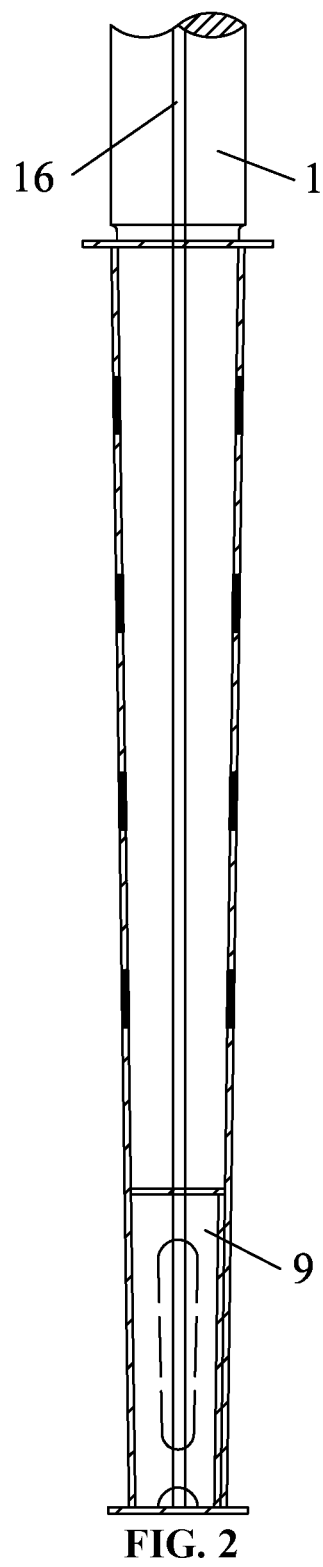
FIG. 2 is a sectional view taken from line A-A in FIG. 1.
Figure 3:
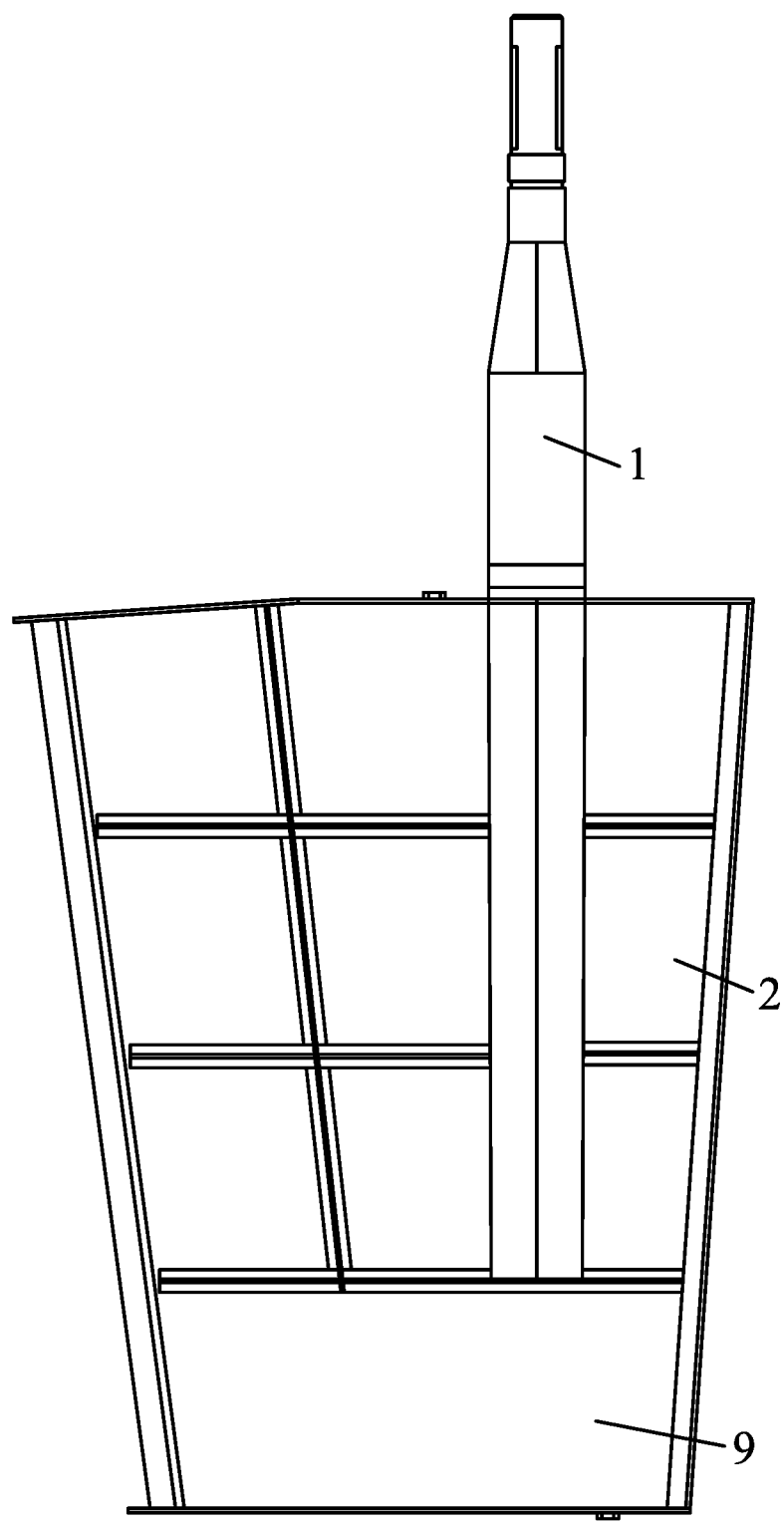
FIG. 3 is a longitudinal sectional view of a rudder blade of a rudder assembly in accordance with one embodiment of the disclosure.
Figure 4:
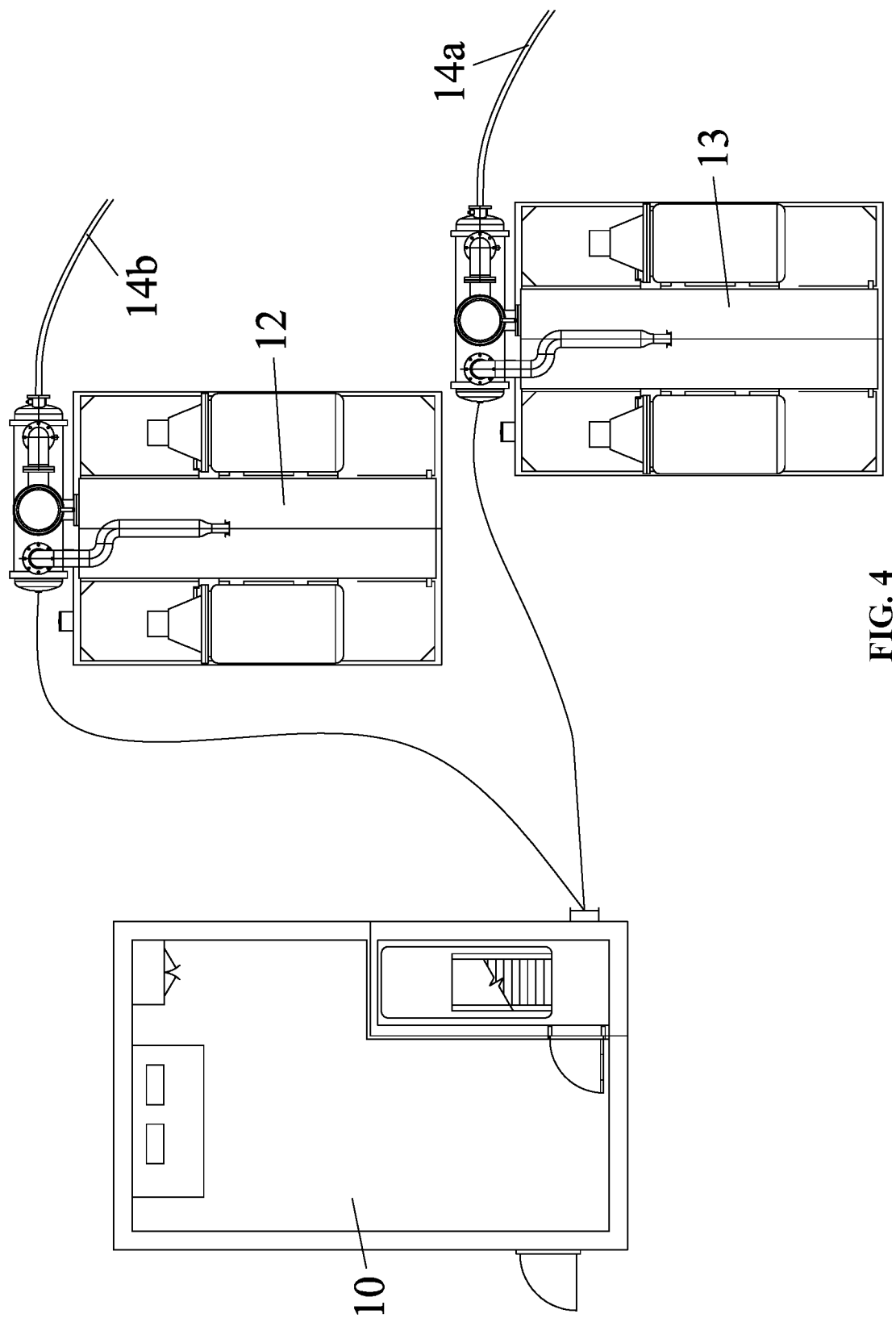
FIG. 4 is a sectional view taken from line B-B in FIG. 1.
Figure 5:
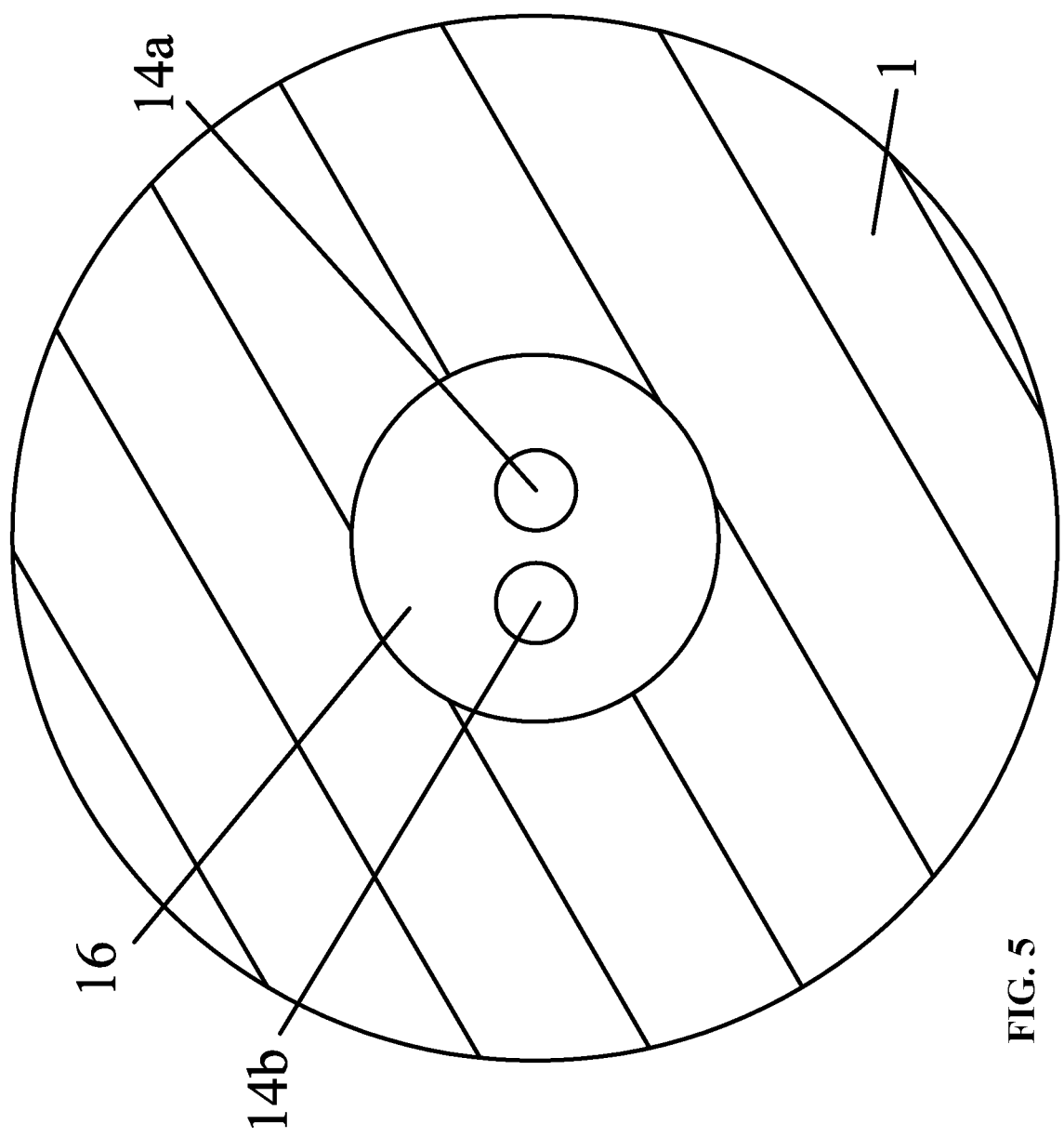
FIG. 5 is a sectional view taken from line C-C in FIG. 1.

In the drawings, the following reference numbers are used: 1. Axial hollow rudder stock; 2. Rudder blade; 3. Propeller; 4. Vessel stern; 5. Steering engine; 6. Tiller; 7. Upper rudder bearing; 8. Lower rudder bearing; 9. Cavity; 10. Console; 12. Reagent storage tank; 13. Compressed air bottle; 14a. Pressure hose; 14b. Reagent conveying hose; 15. Nozzle; 16. Through hole; 17. Control cabinet; 19. Hole.

DETAILED DESCRIPTION OF THE EMBODIMENT

For further illustrating the invention, experiments detailing a rudder assembly are described below. It should be noted that the following examples are intended to describe and not to limit the invention.

FIGS. 1-5 illustrate a rudder assembly comprising a steering engine 5; an axial hollow rudder stock 1; a rudder blade 2; a gas release unit; and a tiller 6. The steering engine 5 is disposed in a vessel stern 4.

The axial hollow rudder stock 1 comprises a through hole 16. The through hole 16 is small and disposed along the axis of the axial hollow rudder stock. The axial hollow rudder stock 1 comprises an upper end connected to the tiller 6, and a lower end fixedly connected to the rudder blade 2. The axial hollow rudder stock 1 is fixed on the vessel stern 4 via an upper rudder bearing 7 and a lower rudder bearing 8. The rudder blade 2 comprises a cavity 9 and a nozzle 15. The cavity 9 is an independent structure located at a lower part of the rudder blade 2. The rudder blade 2 is hung below the vessel stern 4, and is connected to the axial hollow rudder stock 1 through a taper joint. The nozzle 15 is disposed at a bottom of the rudder blade 2. The gas release unit is disposed in the vessel stern 4, and comprises a control cabinet 17. The control cabinet 17 comprises a reagent storage tank 12, a reagent conveying hose 14b connected to the reagent storage tank 12, a compressed air bottle 13, a pressure hose 14a connected to the compressed air bottle 13, and a console 10. The pressure hose 14a and the reagent conveying hose 14b pass through the through hole 16 of the axial hollow rudder stock 1, and then communicate with the cavity 9 of the rudder blade 2. The horizontal position of the nozzle 15 is lower than the propeller 3 of the vessel. The compressed air and the chemical reagents are pumped into the pressure hose 14a and the reagent conveying hose 14b, pass through the axial hollow rudder stock 1, enter the cavity 9 of the rudder blade 2, and then release via the nozzle 15.

Figure 6:
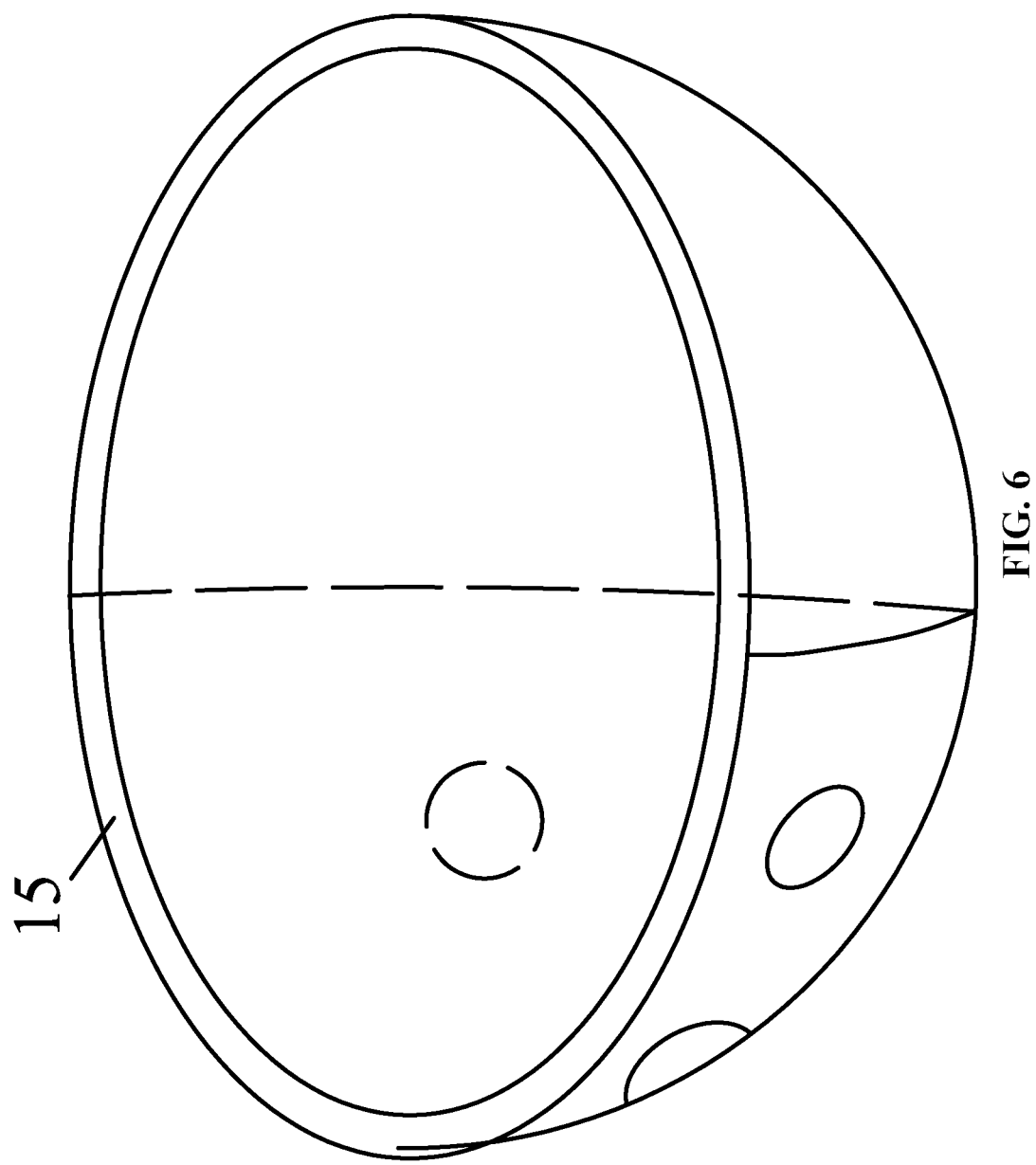
FIG. 6 is a schematic diagram of a nozzle of a rudder assembly in accordance with one embodiment of the disclosure.

FIG. 6 is a schematic diagram of the nozzle, which is streamlined and comprises three releasing holes facing different directions.

Figure 7:
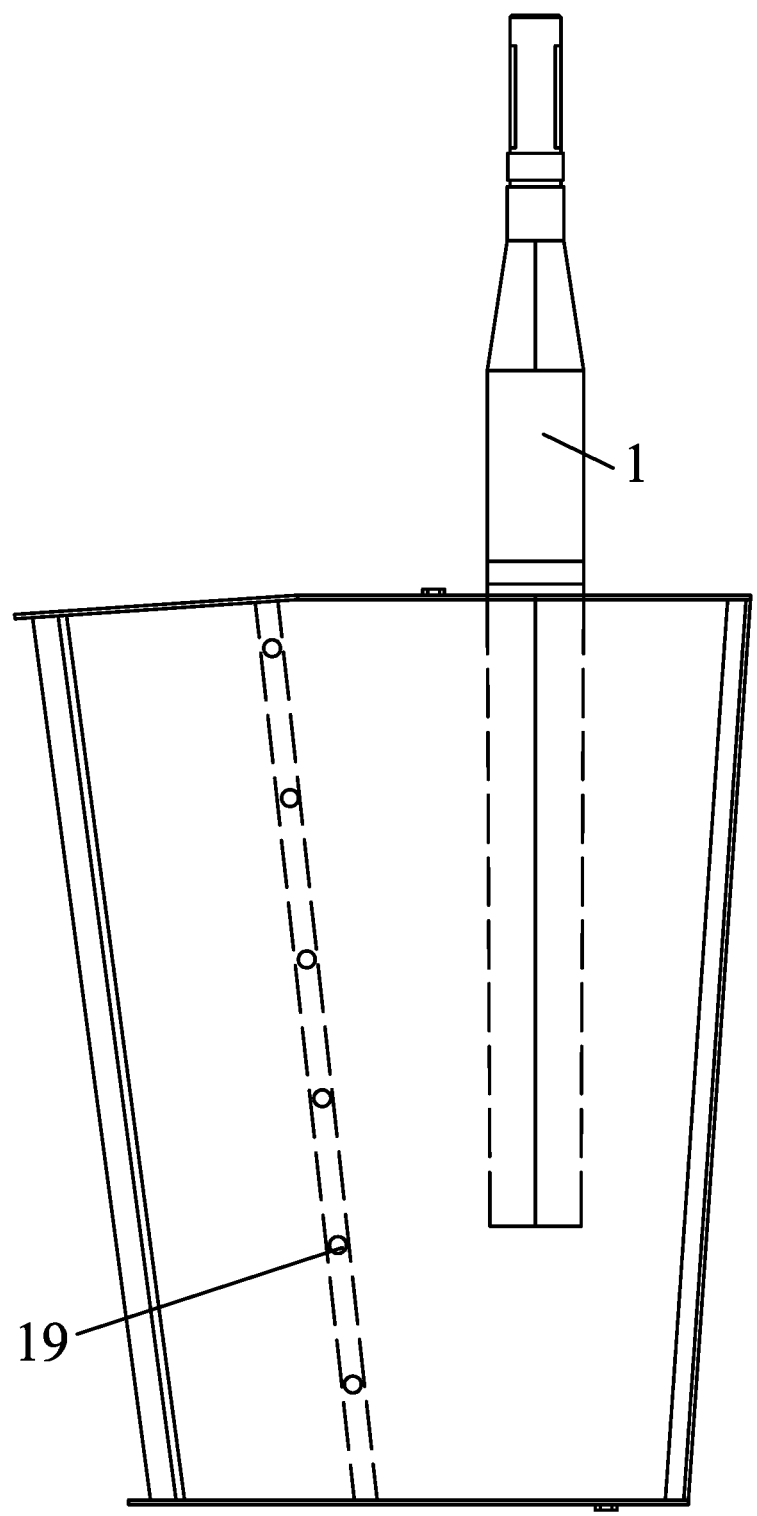
FIG. 7 is a schematic diagram of a rudder blade of a rudder assembly in accordance with one embodiment of the disclosure.
Figure 8:
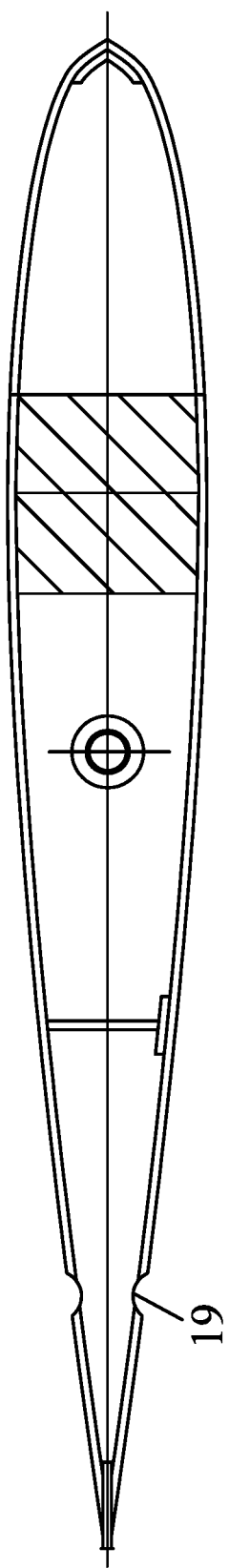
FIG. 8 is a top view of a rudder blade of a rudder assembly in accordance with one embodiment of the disclosure.

FIG. 7 and FIG. 8 illustrate the rudder blade of the rudder assembly. Specifically, two sides of the rudder blade 2 comprise six uniformly distributed holes 19 for releasing compressed air and chemical reagents.

The working principle of the rudder assembly is summarized as follows. The compressed air and the chemical reagents stored in the reagent storage tank 12 and the compressed air bottle 13 are pumped into the pressure hose 14a and the reagent conveying hose 14b, pass through the axial hollow rudder stock 1, enter the cavity 9 disposed at the lower part of the rudder blade 2, and then release via three releasing holes of the nozzle 15 toward different directions, providing the vessels with the functions of emission reduction, drag reduction and defoaming sailing. In addition, two sides of the rudder blade comprise a plurality of uniformly distributed holes 19 for releasing compressed air and chemical reagents, which increases the release area of the compressed air and chemical reagents, and expand the effect of bubble drag reduction and defoaming sailing.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A rudder assembly, comprising:
a steering engine;
an axial hollow rudder stock, the axial hollow rudder stock comprising a through hole;
a rudder blade comprising a cavity and a nozzle;
a gas release unit; and
a tiller;
wherein:
the steering engine is disposed in a vessel stern;
the tiller is connected to the steering engine;
the axial hollow rudder stock comprises an upper end connected to the tiller, and a lower end fixedly connected to the rudder blade;
the axial hollow rudder stock is fixed on the vessel stern via an upper rudder bearing and a lower rudder bearing;
the rudder blade is hung below the vessel stern, and is connected to the axial hollow rudder stock through a taper joint;
the nozzle is disposed at a bottom of the rudder blade;
the gas release unit is disposed in the vessel stern, and comprises a control cabinet; the control cabinet comprises a reagent storage tank, a reagent conveying hose connected to the reagent storage tank, a compressed air bottle, a pressure hose connected to the compressed air bottle, and a console; and
the pressure hose and the reagent conveying hose pass through the through hole of the axial hollow rudder stock, and then communicate with the cavity of the rudder blade.

2. The assembly of claim 1, wherein the through hole is disposed along an axis of the axial hollow rudder stock.

3. The assembly of claim 1, wherein the cavity is an independent structure located at a lower part of the rudder blade.

4. The assembly of claim 1, wherein the nozzle is streamlined and comprises three releasing holes facing different directions.

5. The assembly of claim 1, wherein two sides of the rudder blade comprise a plurality of uniformly distributed holes for releasing compressed air and chemical reagents.

* * * * *